(12) United States Patent
Sano

(10) Patent No.: US 7,297,444 B2
(45) Date of Patent: Nov. 20, 2007

(54) NON-AQUEOUS ELECTROLYTE SECONDARY BATTERY

(75) Inventor: Youko Sano, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/493,670

(22) Filed: Jul. 27, 2006

(65) Prior Publication Data

US 2007/0026313 A1  Feb. 1, 2007

(30) Foreign Application Priority Data

Jul. 27, 2005 (JP) ............... 2005-216720

(51) Int. Cl.
  *H01M 4/48* (2006.01)
  *H01M 4/62* (2006.01)
(52) U.S. Cl. ............... 429/217; 429/231.95
(58) Field of Classification Search .......... 429/217
  See application file for complete search history.

(56) References Cited

U.S. PATENT DOCUMENTS

| | | | | |
|---|---|---|---|---|
| 5,541,019 A | * | 7/1996 | Anani et al. | 429/59 |
| 5,595,841 A | * | 1/1997 | Suzuki | 429/217 |
| 6,090,505 A | * | 7/2000 | Shimamura et al. | 429/218.1 |
| 6,235,427 B1 | * | 5/2001 | Idota et al. | 429/218.1 |
| 6,653,019 B1 | * | 11/2003 | Shimamura et al. | 429/218.1 |
| 6,818,694 B2 | * | 11/2004 | Hindi et al. | 524/446 |
| 7,179,563 B2 | * | 2/2007 | Kim et al. | 429/218.1 |
| 2005/0003272 A1 | * | 1/2005 | Jiang et al. | 429/229 |

FOREIGN PATENT DOCUMENTS

| | | |
|---|---|---|
| JP | 9-289022 | 11/1997 |
| JP | 2005-11802 | 1/2005 |

OTHER PUBLICATIONS

Conducting Materials for Cathodes used in Zinc Air Batteries; Eom et al. (Abs. 183, 2004th Meeting, The American Chemical Society, 2003).*

* cited by examiner

*Primary Examiner*—Mark Ruthkosky
(74) *Attorney, Agent, or Firm*—McDermott Will & Emery LLP

(57) ABSTRACT

In a non-aqueous electrolyte secondary battery having a negative electrode containing Si as a negative electrode active material, a binder containing a non-crosslinked polyacrylic acid having a weight-average molecular weight of 300,000 to 3,000,000 is incorporated into a negative electrode molded article that constitutes the negative electrode, so as to prevent electrode decay resulting from expansion and contraction during charge/discharge, as well as to achieve high energy density and improved charge/discharge cycle characteristics.

8 Claims, 1 Drawing Sheet

NON-AQUEOUS ELECTROLYTE SECONDARY BATTERY

FIELD OF THE INVENTION

The present invention relates to a non-aqueous electrolyte secondary battery. More particularly, this invention relates to an improvement of charge/discharge cycle characteristics of the negative electrode comprising Si, which expands and contracts during charge/discharge, as negative electrode active material.

BACKGROUND OF THE INVENTION

As the negative electrode for non-aqueous electrolyte secondary batteries, substances capable of absorbing and desorbing lithium ions such as a carbon material have conventionally been used, and lithium ion secondary batteries employing such substances are commercially available. As the binder, styrene butadiene rubber (SBR) and carboxymethyl cellulose (CMC) are typically used. However, non-aqueous electrolyte secondary batteries having sufficient energy density and charge/discharge cycle characteristics have not been achieved yet.

Meanwhile, investigations have been done on the use of materials containing Si as a negative electrode active material that contributes to higher energy density and excellent charge/discharge cycle characteristics. For example, Japanese Laid-Open Patent Publication No. Hei 9-289022 proposes the use of SiO as a negative electrode active material and an acrylic acid polymer as a binder. Likewise, Japanese Laid-Open Patent Publication No. 2005-11802 proposes the use of an alloy containing Si as a negative electrode active material.

However, when the negative electrode of a non-aqueous electrolyte secondary battery contains an active material containing Si having high energy density, the use of conventionally used SBR or CMC cannot yield sufficient binding property, and therefore electrode decay resulting from expansion and contraction during charge/discharge cannot be prevented completely. Likewise, the use of polyacrylic acid having a low weight-average molecular weight cannot yield sufficient binding property, and electrode decay due to expansion and contraction during charge/discharge cannot be prevented completely.

The weight-average molecular weight of polyacrylic acid has a correlation with binding property or viscosity. If the weight-average molecular weight is low, the binding property will be low. If the weight-average molecular weight is high, the viscosity will be high. Accordingly the use of polyacrylic acid having a low weight-average molecular weight cannot yield sufficient binding property, failing to prevent the electrode decay resulting from expansion and contraction during charge/discharge. If the viscosity increases with a high weight-average molecular weight, it makes the dispersion of polyacrylic acid difficult, creating variations in battery characteristics.

When the electrode contains an active material containing Si, the active material reacts with a trace amount of water in the battery during charge/discharge, producing a gas. Because cross-linked polyacrylic acid, lithium salt of cross-linked polyacrylic acid, sodium salt of cross-linked polyacrylic acid and calcium salt of cross-linked polyacrylic acid, lithium salt of non-crosslinked polyacrylic acid, sodium salt of non-crosslinked polyacrylic acid and calcium salt of non-crosslinked polyacrylic acid are highly hygroscopic, they are not suitable for use as binders.

Furthermore, because polymethacrylic acid and polyacrylic ester are soluble in electrolytes, they dissolve in the presence of electrolytes, so that the electrode cannot retain its shape, leading to a significant decrease in charge/discharge cycle characteristics.

When the electrode contains an active material containing Si having high energy density, the electrode expands and contracts during charge/discharge. In the case of an electrode produced by applying, onto a current collector, a slurry (electrode material mixture) prepared by mixing an active material and a binder with a dispersing medium such as water or an organic solvent, a thin active material layer (material mixture layer) formed on the current collector is bonded to the current collector by the binder. Accordingly, even if the active material expands and contracts during charge/discharge, the conductivity is unlikely to decrease.

In the case of an electrode formed of a molded article in the form of a pellet having a certain thickness without a current collector, however, the strength of the molded article lowers due to expansion and contraction of the active material, leading to electrode decay. As a result, the conductivity decreases, and the charge/discharge characteristics decrease significantly.

BRIEF SUMMARY OF THE INVENTION

In view of the above, an object of the present invention is to provide a non-aqueous electrolyte secondary battery comprising an electrode formed in the form of a molded article, wherein the strength of the molded article does not decrease even when the active material expands and contracts, the electrode retains its shape, and the degradation of conductivity and charge/discharge cycle characteristics is prevented completely.

In order to address the above problem, the present invention provides a non-aqueous electrolyte secondary battery including: a positive electrode capable of absorbing and desorbing lithium reversibly; and a negative electrode comprising a porous molded article including a negative electrode active material comprising Si, a conductive material and a binder, wherein the binder comprises a non-crosslinked polyacrylic acid having a weight-average molecular weight of 300,000 to 3,000,000.

By forming the negative electrode in the form of a porous molded article as above, the expansion and contraction of the negative electrode active material containing Si during charge/discharge can be absorbed or reduced. Moreover, because the negative electrode contains, as the binder, a non-crosslinked polyacrylic acid having a weight-average molecular weight of 300,000 to 3,000,000, the strength of the molded article can be retained, and electrode decay during charge/discharge can be prevented. As a result, a non-aqueous electrolyte secondary battery having high energy density and excellent charge/discharge characteristics can be obtained.

The negative electrode preferably contains the binder in an amount of 2 to 40 wt %.

The non-crosslinked polyacrylic acid preferably has a weight-average molecular weight of 500,000 to 2,000,000.

The negative electrode active material preferably comprises either Si or an alloy containing Si.

The negative electrode active material preferably comprises an alloy containing Si and a metal incapable of forming an alloy with Li.

For example, the negative electrode active material preferably comprises a phase A containing Si and a phase B containing an intermetallic compound comprising a transition metal element and Si, and the transition metal element preferably is at least one selected from the group consisting of Ti, Zr, Fe, Co, Ni and Cu.

The molded article preferably has a thickness of 50 to 800 μm.

The molded article preferably has a porosity of 10 to 60%.

According to the present invention, it is possible to provide a non-aqueous electrolyte secondary battery comprising an electrode formed in the form of a molded article, wherein the strength of the molded article does not decrease even when the active material expands and contracts, the electrode retains its shape, and the degradation of conductivity and charge/discharge cycle characteristics is prevented completely.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Figure 1:
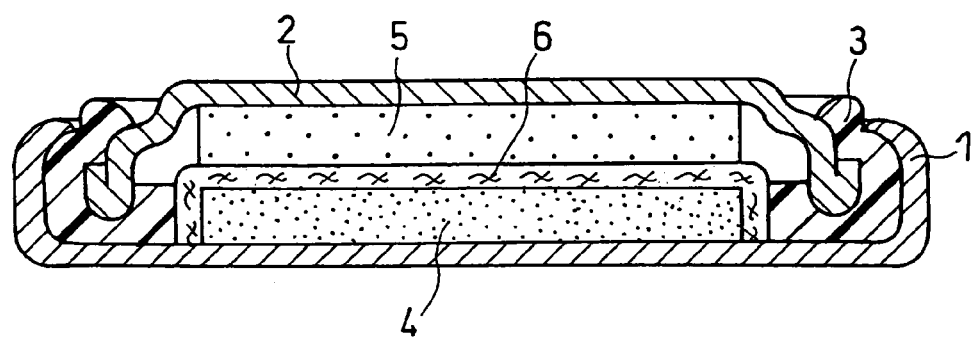
FIG. 1 is a schematic cross-sectional view of a non-aqueous electrolyte secondary battery according to one embodiment of the present invention.

Preferred embodiments of the present invention will be described in detail below, but it should be appreciated that the present invention is not limited thereto.

As described previously, the present invention provides a non-aqueous electrolyte secondary battery having high energy density and excellent charge/discharge cycle characteristics by incorporating a non-crosslinked polyacrylic acid having a weight-average molecular weight of 300000 to 3000000 into a negative electrode comprising a porous molded article including a negative electrode active material containing Si, a conductive material and a binder. The negative electrode is a molded article formed by forcing a negative electrode material mixture into a metal mold, so that the production thereof does not require an application step in which a negative electrode material mixture slurry is applied to a current collector.

A feature of the present invention is the use of "non-crosslinked polyacrylic acid" as the binder (polymer component) for the negative electrode. As used herein, the "non-crosslinked polyacrylic acid" includes polyacrylic acids represented by [—$CH_2$—CH(COOH)—]$_n$ except salts thereof in which the polymer chains are not cross-linked to each other. Accordingly, the non-crosslinked polyacrylic acid is different from "cross-linked polyacrylic acid". A preferred example of the non-crosslinked polyacrylic acid is AC-10H available from Nihon Junyaku Co., Ltd.

The "non-crosslinked polyacrylic acid" contained in the binder for use in the present invention preferably has a weight-average molecular weight of 500,000 to 2,000,000. When the binder contains a non-crosslinked polyacrylic acid having a weight-average molecular weight of 500,000 or more, the strength of the negative electrode molded article can be surely enhanced. When the binder contains a non-crosslinked polyacrylic acid having a weight-average molecular weight of 2000000 or less, the dispersibility can be improved. More preferably, the "non-crosslinked polyacrylic acid" has a weight-average molecular weight of 500000 to 1000000.

The weight-average molecular weight can be measured by gel permeation chromatography (GPC).

Another feature of the present invention is the formation of the negative electrode in the form of a porous molded article comprising a conductive material and a binder. As used herein, the "porous molded article" means a molded article having pores inside thereof. The porous molded article preferably has a porosity of 10 to 60%. Because the expansion and contraction of the negative electrode active material during charge/discharge can be absorbed and reduced, whereby the negative electrode surely retains its shape. More preferably, the porosity is 30 to 50%.

The porosity can be controlled by changing the conditions for producing the porous molded article. When producing the porous molded article by applying pressure onto a negative electrode material mixture placed in a metal mold, for example, the compression force can be adjusted to control the porosity.

The porosity can be calculated using a volume $V_1$ determined from the size of resulting molded article and an absolute volume $V_0$ of the molded article, and represented by $\{(V_1-V_0)/V_1\} \times 100(\%)$.

The negative electrode material mixture preferably contains the binder (polymer component on a dry weight basis) in an amount of 2 to 40 wt % because high energy density and excellent charge/discharge characteristics can be obtained. When the negative electrode material mixture contains the binder in an amount of 2 wt % or more, sufficient binding property can be obtained. When the amount of the binder is 40 wt % or less, it is possible to ensure sufficient ratios of components other than the binder such as negative electrode active material and conductive material, preventing the discharge capacity from decreasing and the ratio of the non-crosslinked polyacrylic acid serving as an insulator from increasing. As a result, an increase in the polarization of the negative electrode and a decrease in the rate characteristics can be prevented.

The negative electrode active material preferably contains either Si or an alloy containing Si because high energy density is obtained. Particularly, the negative electrode active material preferably contains an alloy containing Si and a metal incapable of forming an alloy with Li. Although the details are not known, it can be assumed that the repetition of charge and discharge can cause deterioration of the negative electrode active material, so that the incorporation of a metal other than Si can prevent the deterioration.

The negative electrode active material preferably comprises an alloy material capable of absorbing and desorbing Li reversibly. The alloy material preferably comprises a phase A containing Si and a phase B containing an intermetallic compound comprising a transition metal element and Si. The transition metal element preferably is at least one selected from the group consisting of Ti, Zr, Fe, Co, Ni and Cu.

Note that the transition metal element is a "metal incapable of forming an alloy with Li".

The weight ratio between the phase A containing Si and the phase B containing an intermetallic compound comprising a transition metal element and Si is not specifically limited. As long as the weight ratio of the phase A in the negative electrode active material is 5 to 95 wt %, the advantage of the present invention can be obtained similarly. The phase A containing Si is not limited to either crystalline or amorphous.

The method for producing the negative electrode active material is not specifically limited. Any known method for producing an alloy can be used such as mechanical alloying, mechanical milling, molding, liquid quenching, ion beam sputtering, vacuum deposition, plating, and chemical vapor deposition.

The negative electrode is preferably a porous molded article containing at least a negative electrode active material containing Si, a conductive material and a binder. The porous molded article preferably has a thickness of 50 to 800 µm. When the porous molded article has a thickness of 50 µm or more, the strength of the porous molded article can be ensured sufficiently. When the thickness is 800 µm or less, influence from expansion and contraction of the negative electrode active material during charge/discharge can be reduced.

The conductive material that can be used in the positive and negative electrodes of the present invention can be any conductive material as long as it is an electron conductor that does not cause any chemical change at a charge/discharge potential of the electrode material used. Examples include graphite, carbon black, carbon fiber, metal fiber and organic conductive material. They may be used singly or as a mixture of two or more. The amount of the conductive material is not specifically limited.

There is no limitation on the positive electrode active material. Examples include: metal oxides such as $LiCoO_2$, $LiNiO_2$, $LiMn_2O_4$, $LiMnO_2$, $Li_4Mn_5O_{12}$, $Li_2Mn_4O_9$, $V_2O_5$, $V_6O_{13}$, $MnO_2$, $WO_3$, $Nb_2O_5$ and $Li_{4/3}Ti_{5/3}O_4$; composite oxides such as $LiCO_{1-x}Ni_xO_2$ and $LiMn_{2-x}A_xO_4$ (where A represents an element other than manganese); and polymers such as polyaniline. Particularly preferred is a material capable of intercalating and deintercalating lithium ions. A plurality of the positive electrode active materials listed above may be mixed for use. When forming the positive electrode using the above-listed positive electrode active material(s), any known conductive material and binder can be added.

Examples of the solute that constitutes the organic electrolyte include $LiPF_6$, $LiBF_4$, $LiClO_4$, $LiCF_3SO_3$, $LiN(CF_3SO_2)_2$, $LiN(C_2F_5SO_2)_2$ and $LiN(CF_3SO_2)(C_4F_9SO_2)$. They may be used singly or as a mixture of two or more.

Examples of the solvent include, but not limited to, propylene carbonate, ethylene carbonate, butylene carbonate, vinylene carbonate, dimethyl carbonate, diethyl carbonate, sulfolane, dimethoxyethane, diethoxyethane, tetrahydrofuran, dioxolane and γ-butyrolactone. They may be used singly or in any combination of two or more. The organic solvent is also suitable to use with gel electrolytes.

The non-aqueous electrolyte secondary battery of the present invention can come in various shapes. The present invention is applicable to coin type batteries, for example. FIG. 1 shows a schematic cross-sectional view of a coin type battery according to one embodiment of the present invention. As can be seen from FIG. 1, in this coin type battery, a positive electrode 4 and a negative electrode 5, each in the form of a pellet, are in contact with each other with a separator 6 interposed therebetween. These are crimp-sealed by a negative electrode can 2 equipped with a gasket 3 and a positive electrode can 1. The size of the coin type battery is, for example, an outer diameter of 6.8 mm and a height of 2.1 mm.

Examples and comparative examples of the present invention will be described below. It should be appreciated that the content of the present invention is not limited thereto.

EXAMPLE 1

In this example, a coin type battery (having an outer diameter of 6.8 mm and a height of 2.1 mm) as shown in FIG. 1 was produced.

A negative electrode active material was obtained by mechanical alloying. More specifically, accurately weighed 1.7 kg of mixed powder of Ti and Si at a weight ratio of Ti:Si=36.8:63.2 was introduced into a vibrating mill (FV-20 available from Chuo Kakohki Co. Ltd.). Then, a stainless steel balls (with a diameter of 2 cm) were further introduced thereinto in an amount of 300 kg. After the container was evacuated into a vacuum state, Ar (having a purity of 99.999%, available from Nippon Sanso Corporation) was introduced thereinto, and the pressure in the container was adjusted to a pressure of 1 atmosphere. The mill was operated at a vibration amplitude of 8 mm and a rotation rate of 1200 rpm. Under the conditions, mechanical alloying was performed for 80 hours. A Ti 37 wt %-Si 63 wt % alloy powder obtained from the mechanical alloying was sieved to obtain a negative electrode active material having a particle size of 45 µm or less.

In the negative electrode 5, the Ti 36.8 wt %-Si 63.2 wt % alloy powder obtained from the mechanical alloying was used as the negative electrode active material, and graphite was used as the conductive material. As the binder, a binder containing a non-crosslinked polyacrylic acid having a weight-average molecular weight of about 300,000 (JURYMER AC-10H available from Nihon Junyaku Co., Ltd.) was used. The active material, conductive material and binder were mixed at a weight ratio of 70:23:7 to prepare a negative electrode material mixture. The obtained negative electrode material mixture was pressed at 1 ton/cm$^2$ to form a pellet having a diameter of 4.1 to 4.2 mm and a thickness of 0.46 to 0.48 mm. The obtained negative electrode molded article had a porosity of 30%. The negative electrode molded article was dried under reduced pressure at 160° C. for 10 hours, after which lithium was press-bonded such that the molar ratio of Li and Si was Li/Si=2.6. Thereby, a negative electrode was produced.

The positive electrode active material used was a lithium-containing manganese oxide prepared by heating a mixture of electrolytic manganese dioxide and lithium hydroxide at a molar ratio of Mn:Li=1:0.4, at 390° C. in an atmosphere for 6 hours. To this positive electrode active material, carbon black serving as the conductive material and fluorocarbon resin serving as the binder were added, which were then mixed at a weight ratio of 90:6:4 to prepare a positive electrode material mixture. This positive electrode material mixture was pressed at 1 ton/cm$^2$ to form a pellet having a diameter of 4.1 to 4.2 mm and a thickness of 1.0 to 1.2 mm. This positive electrode pellet was dried under reduced pressure at 250° C. for 10 hours. The resultant was denoted as positive electrode 4.

The non-aqueous electrolyte used was an electrolyte prepared by dissolving 1 M of supporting salt $LiN(C_2F_5SO_2)_2$ in a solvent mixture of propylene carbonate (PC), ethylene carbonate (EC) and dimethoxyethane (DME) at a ratio of 3:1:3.

Subsequently, the negative electrode 5 in the form of a pellet and a separator 6 (available from Tapyrus Co., Ltd.) were placed in a negative electrode can 2 equipped with a gasket 3. The electrolyte prepared above was injected into the can 2. Then, the positive electrode 4 in the form of a pellet was placed in the can 2, after which the negative electrode can 2 and the positive electrode can 1 were crimp-sealed. Thereby, a coin type battery of EXAMPLE 1 was produced.

EXAMPLES 2 TO 5 AND COMPARATIVE EXAMPLES 1 TO 3

Coin type batteries were produced in the same manner as in EXAMPLE 1 except that, as the non-crosslinked polyacrylic acid contained in the binder of the negative electrode, non-crosslinked polyacrylic acids having a weight-average molecular weight of about 500,000, 1,000,000 (JURYMER AC-10SH), 2,000,000, 3,000,000, 30,000 (JURYMER AC-10L), 150,000 and 4,000,000 were used instead of the non-crosslinked polyacrylic acid having a weight-average molecular weight of about 300,000 (JURYMER AC-10H).

Note that the non-crosslinked polyacrylic acids, except for those having weight-average molecular weights of about 1,000,000 and 30,000, were prepared through polymerization by heating an acrylic acid monomer in water using a polymerization initiating agent such as ammonium peroxosulfate.

[Evaluation Test]

The coin type batteries of EXAMPLES 1 to 5 and COMPARATIVE EXAMPLES 1 to 3, three of each, were prepared. Each battery was repeatedly cycled (charged and discharged) at a constant current of 0.3 mA/cm$^2$ between 3.1 V to 2.0 V.

Table 1 shows the weight-average molecular weight of non-crosslinked polyacrylic acid, the discharge capacity at the second cycle, and the rate of discharge capacity at the 50th cycle relative to that of the second cycle expressed in percentage (retention rate) for each battery.

As can be seen from Table 1, no difference was observed in initial discharge capacity among the non-crosslinked polyacrylic acids having different weight-average molecular weights. As for the charge/discharge characteristics, the higher weight-average molecular weight the non-crosslinked polyacrylic acid had, the better the charge/discharge characteristics. This is presumably because the binding property of the negative electrode material mixture improved as the weight-average molecular weight of non-crosslinked polyacrylic acid increased, and thus the effect of preventing the pellet from decaying during charge/discharge was high. Although these examples and comparative examples illustrated the cases of the non-crosslinked polyacrylic acids having weight-average molecular weights of about 300,000, 500,000, 1,000,000, 2,000,000 and 3,000,000, similar effects and advantages were obtained as long as the weight-average molecular weight was within the above range. When a non-crosslinked polyacrylic acid having a weight-average molecular weight exceeding 3,000,000 was contained in the binder, the resulting negative electrode material mixture was too viscous to form into a pellet. Further, all the coin type batteries were disassembled after the charge/discharge cycles for analysis, which revealed that the negative electrode of the coin type battery of COMPARATIVE EXAMPLE 1, which contained the non-crosslinked polyacrylic acid having the lowest weight-average molecular weight, decayed most significantly.

EXAMPLES 6 TO 9

Coin type batteries were produced in the same manner as in EXAMPLE 3 except that the weight ratio of the active material, conductive material and binder contained in the negative electrode was changed to the following weight ratios:

73.8:24.2:2.0 (EXAMPLE 6);
45.2:14.8:40.0 (EXAMPLE 7);
74.5:24.5:1.0 (EXAMPLE 8); and
37.6:12.4:50.0 (EXAMPLE 9).

[Evaluation Test]

The coin type batteries of EXAMPLES 6 to 9, three of each, were prepared. Each battery was repeatedly cycled at a constant current of 0.3 mA/cm$^2$ between 3.1 V to 2.0 V.

Table 2 shows the discharge capacity at the second cycle, and the rate of discharge capacity at the 50th cycle relative to that of the second cycle expressed in percentage (retention rate) for each battery.

TABLE 1

|  | Weight-average molecular weight of non-crosslinked polyacrylic acid | Discharge capacity at second cycle (mAh) | | | Discharge capacity retention rate at 50th cycle (%) | | |
| --- | --- | --- | --- | --- | --- | --- | --- |
| Ex. 1 | About 300,000 | 4.5 | 4.5 | 4.6 | 65 | 68 | 68 |
| Ex. 2 | About 500,000 | 4.5 | 4.6 | 4.6 | 77 | 78 | 80 |
| Ex. 3 | About 1,000,000 | 4.5 | 4.6 | 4.6 | 80 | 81 | 83 |
| Ex. 4 | About 2,000,000 | 4.6 | 4.6 | 4.6 | 82 | 83 | 85 |
| Ex. 5 | About 3,000,000 | 4.6 | 4.6 | 4.6 | 75 | 82 | 85 |
| Comp. Ex. 1 | About 30,000 | 4.5 | 4.5 | 4.5 | 10 | 11 | 13 |
| Comp. Ex. 2 | About 150,000 | 4.5 | 4.5 | 4.5 | 25 | 32 | 33 |
| Comp. Ex. 3 | About 4,000,000 | — | — | — | — | — | — |

TABLE 2

|  | Discharge capacity at second cycle (mAh) | | | Discharge capacity retention rate at 50th cycle (%) | | |
| --- | --- | --- | --- | --- | --- | --- |
| Ex. 6 | 4.5 | 4.5 | 4.6 | 68 | 68 | 69 |
| Ex. 7 | 4.1 | 4.1 | 4.2 | 80 | 80 | 82 |
| Ex. 8 | 4.5 | 4.5 | 4.5 | 56 | 57 | 57 |
| Ex. 9 | 3.1 | 3.1 | 3.3 | 79 | 80 | 83 |

Table 2 illustrates that, particularly, the batteries of EXAMPLES 6 and 7 whose ratio of non-crosslinked polyacrylic acid to the negative electrode material mixture was 2 to 40 wt % were superior in terms of both discharge capacity and charge/discharge characteristics. In the batteries of EXAMPLE 8 whose ratio of non-crosslinked polyacrylic acid to the negative electrode material mixture was less than 2 wt %, a decrease in charge/discharge characteristics resulting from poor binding property was observed. The batteries of EXAMPLE 9 whose ratio of non-crosslinked polyacrylic acid exceeded 2 wt % exhibited low initial capacities. Presumably, this is because the ratio of non-crosslinked polyacrylic acid was increased, so that the ratio of negative electrode active material was reduced and the polarization increased, degrading the rate characteristics.

COMPARATIVE EXAMPLES 4 TO 6

Coin type batteries were produced in the same manner as in EXAMPLE 1 except that a cross-linked polyacrylic acid was contained in the binder of the negative electrode, and that the following cross-linked polyacrylic acids were used:

cross-linked polyacrylic acid having an average molecular weight of about 1000000 and a carboxyl group content of 60% (COMPARATIVE EXAMPLE 4);

cross-linked polyacrylic acid having an average molecular weight of about 2000000 and a carboxyl group content of 60% (COMPARATIVE EXAMPLE 5); and cross-linked polyacrylic acid having an average molecular weight of about 3000000 and a carboxyl group content of 60% (COMPARATIVE EXAMPLE 6).

[Evaluation Test]

The coin type batteries of COMPARATIVE EXAMPLES 4 to 6, three of each, were prepared. Each battery was repeatedly cycled at a constant current of 0.3 mA/cm$^2$ between 3.1 V to 2.0 V.

Table 3 shows the weight-average molecular weight of cross-linked polyacrylic acid, the discharge capacity at the second cycle, and the rate of discharge capacity at the 50th cycle relative to that of the second cycle expressed in percentage (retention rate) for each battery.

the (charge/discharge) characteristics. This is because, similar to the non-crosslinked polyacrylic acids, the higher the weight-average molecular weight, the more the effect of preventing the pellet from decaying improved. At the same time, the weight-average molecular weight increased excessively, viscosity increased and the cross-linked polyacrylic acid became difficult to disperse.

Overall, the coin type batteries containing cross-linked polyacrylic acid exhibited poorer charge/discharge cycle characteristics than the coin type batteries of the present invention containing non-crosslinked polyacrylic acid.

COMPARATIVE EXAMPLES 7 AND 8

Coin type batteries were produced in the same manner as in EXAMPLE 7 except that a cross-linked polyacrylic acid was contained in the binder of the negative electrode, and that the following cross-linked polyacrylic acids were used:

cross-linked polyacrylic acid having an average molecular weight of about 1000000 and a carboxyl group content of 60% (COMPARATIVE EXAMPLE 7); and cross-linked polyacrylic acid having an average molecular weight of about 2000000 and a carboxyl group content of 60% (COMPARATIVE EXAMPLE 8).

[Evaluation Test]

The coin type batteries of COMPARATIVE EXAMPLES 7 and 8, three of each, were prepared. Each battery was repeatedly cycled at a constant current of 0.3 mA/cm$^2$ between 3.1 V to 2.0 V.

Table 4 shows the weight-average molecular weight of cross-linked polyacrylic acid, the discharge capacity at the second cycle, and the rate of discharge capacity at the 50th cycle relative to that of the second cycle expressed in percentage (retention rate) for each battery.

TABLE 3

| | Weight-average molecular weight of cross-linked polyacrylic acid | Discharge capacity at second cycle (mAh) | | | Discharge capacity retention rate at 50th cycle (%) | | |
|---|---|---|---|---|---|---|---|
| Comp. Ex. 4 | About 1000000 | 4.4 | 4.5 | 4.5 | 40 | 42 | 43 |
| Comp. Ex. 5 | About 2000000 | 4.5 | 4.5 | 4.6 | 48 | 50 | 51 |
| Comp. Ex. 6 | About 3000000 | 4.3 | 4.5 | 4.6 | 49 | 51 | 70 |

As can be seen from Table 3, a similar tendency to the present invention was observed even when cross-linked polyacrylic acids were used. The charge/discharge characteristics improved as the weight-average molecular weight

TABLE 4

| | Weight-average molecular weight of cross-linked polyacrylic acid | Discharge capacity at second cycle (mAh) | | | Discharge capacity retention rate at 50th cycle (%) | | |
|---|---|---|---|---|---|---|---|
| Comp. Ex. 7 | About 1000000 | 4.0 | 4.1 | 4.1 | 45 | 48 | 49 |
| Comp. Ex. 8 | About 2000000 | 4.1 | 4.1 | 4.1 | 51 | 52 | 54 | of cross-linked polyacrylic acid contained in the binder was increased. However, in the coin type batteries (of COMPARATIVE EXAMPLE 6) whose binder contained the cross-linked polyacrylic acid having a weight-average molecular weight of 3000000, variations were observed in As can be seen from Table 4, when the ratio of cross-linked polyacrylic acid was increased, there was an improvement in charge/discharge cycle characteristics, but the charge/discharge characteristics were lower than those of the present invention.

From the foregoing, it can be concluded that the batteries of the present invention can exhibit excellent charge/discharge cycle characteristics in a wider range of weight-average molecular weight than the batteries containing cross-linked polyacrylic acid.

EXAMPLES 10 TO 14

Coin type batteries were produced in the same manner as in EXAMPLE 3 except that the following alloys were used as the negative electrode active material:

Zr 36.8 wt %-Si 63.2 wt % alloy (EXAMPLE 10);
Fe 36.8 wt %-Si 63.2 wt % alloy (EXAMPLE 11);
Co 36.8 wt %-Si 63.2 wt % alloy (EXAMPLE 12);
Ni 36.8 wt %-Si 63.2 wt % alloy (EXAMPLE 13); and
Cu 36.8 wt %-Si 63.2 wt % alloy (EXAMPLE 14).

[Evaluation Test]

The coin type batteries of EXAMPLES 10 to 14, three of each, were prepared. Each battery was repeatedly cycled at a constant current of 0.3 mA/cm² between 3.1 V to 2.0 V.

Table 5 shows the metal (hereinafter simply referred to as M) contained in the alloy contained in the negative electrode active material and the rate of discharge capacity at the 50th cycle relative to that of the second cycle expressed in percentage (retention rate) for each battery.

TABLE 5

| | M contained in alloy | Discharge capacity retention rate at 50th cycle (%) | | |
|---|---|---|---|---|
| Ex. 10 | Zr | 76 | 77 | 78 |
| Ex. 11 | Fe | 75 | 75 | 77 |
| Ex. 12 | Co | 76 | 77 | 78 |
| Ex. 13 | Ni | 77 | 77 | 79 |
| Ex. 14 | Cu | 75 | 76 | 78 |
| Ex. 3 | Ti | 80 | 81 | 83 |

As can be seen from Table 5, all the coin batteries of EXAMPLES 10 to 14, each containing an M 36.8 wt %-Si63.2 wt % alloy (M being at least one selected from the group consisting of Zr, Fe, Co, Ni and Cu) as the negative electrode active material, exhibited excellent charge/discharge cycle characteristics. Particularly, the batteries of EXAMPLE 3 containing a Ti—Si alloy (M being Ti) exhibited the most excellent charge/discharge characteristics. Although EXAMPLES 10 to 14 employed non-crosslinked polyacrylic acids having weight-average molecular weights of about 1,000,000 as the binder of the negative electrode, it is needless to state that even the batteries containing non-crosslinked polyacrylic acids having weight-average molecular weights of 300,000 to 3,000,000 can exhibit similar charge/discharge cycle characteristics to those of batteries of EXAMPLES 10 to 14.

EXAMPLES 15 TO 18

Coin type batteries were produced in the same manner as in EXAMPLE 3 except that the thickness of the negative electrode molded article was varied to the following thicknesses by changing the weight of the negative electrode material mixture:

50 μm (EXAMPLE 15);
150 μm (EXAMPLE 16);
500 μm (EXAMPLE 17); and
800 μm (EXAMPLE 18).

[Evaluation Test]

The coin type batteries of EXAMPLES 15 to 18, three of each, were prepared. Each battery was repeatedly cycled at a constant current of 0.3 mA/cm² between 3.1 V to 2.0 V.

Table 6 shows the thickness of the negative electrode molded article and the rate of discharge capacity at the 50th cycle relative to that of the second cycle expressed in percentage (retention rate) for each battery.

TABLE 6

| | Thickness of negative electrode molded article (μm) | Discharge capacity retention rate at 50th cycle (%) | | |
|---|---|---|---|---|
| Ex. 15 | 50 | 80 | 81 | 82 |
| Ex. 16 | 150 | 81 | 81 | 82 |
| Ex. 17 | 500 | 78 | 79 | 80 |
| Ex. 18 | 800 | 74 | 76 | 77 |

As can be seen from Table 6, in the coin type batteries whose negative electrode molded article had a thickness of 500 μm or more, their charge/discharge cycle characteristics decreased as the thickness of the negative electrode molded article was increased. Although EXAMPLES 15 to 18 employed non-crosslinked polyacrylic acids having weight-average molecular weights of about 1,000,000 as the binder of the negative electrode, it is needless to state that even the batteries containing non-crosslinked polyacrylic acids having weight-average molecular weights of 300,000 to 3,000,000 can exhibit similar charge/discharge cycle characteristics to those of batteries of EXAMPLES 15 to 18.

EXAMPLES 19 TO 21

Coin type batteries were produced in the same manner as in EXAMPLE 1 except that the porosity of the negative electrode molded article was changed to 10% (EXAMPLE 19), 20% (EXAMPLE 20), 50% (EXAMPLE 21) or 60% (EXAMPLE 22) by adjusting the thickness of the negative electrode by changing the pressure applied to the negative electrode material mixture during the formation of a pellet.

[Evaluation Test]

The coin type batteries of EXAMPLES 19 to 22, three of each, were prepared. Each battery was repeatedly cycled at a constant current of 0.3 mA/cm² between 3.1 V to 2.0 V.

Table 7 shows the porosity of the negative electrode molded article and the rate of discharge capacity at the 50th cycle relative to that of the second cycle expressed in percentage (retention rate) for each battery.

TABLE 7

| | Porosity (%) | Discharge capacity retention rate at 50th cycle (%) | | |
|---|---|---|---|---|
| Ex. 19 | 10 | 79 | 80 | 81 |
| Ex. 20 | 20 | 80 | 81 | 81 |
| Ex. 21 | 50 | 77 | 80 | 81 |
| Ex. 22 | 60 | 76 | 77 | 79 |

Table 7 illustrates that the batteries whose negative electrode molded article had a porosity of 10 to 60% exhibited excellent charge/discharge characteristics. Although EXAMPLES 19 to 22 employed non-crosslinked polyacrylic acids having weight-average molecular weights of about 1,000,000 as the binder of the negative electrode, it is needless to state that even the batteries containing non-crosslinked polyacrylic acids having weight-average molecular weights of 300,000 to 3,000,000 can exhibit similar charge/discharge cycle characteristics to those of batteries of EXAMPLES 19 to 22.

In the non-aqueous electrolyte secondary battery of the present invention, an active material containing Si, a conductive material and a binder containing a non-crosslinked polyacrylic acid are contained in the negative electrode. The negative electrode comprises a porous molded article. As a result, it is possible to provide a non-aqueous electrolyte secondary battery having high energy density and excellent charge/discharge cycle characteristics, wherein electrode decay resulting from expansion and contraction of the active material during charge/discharge is prevented completely.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A non-aqueous electrolyte secondary battery including: a positive electrode capable of absorbing and desorbing lithium reversibly; and a negative electrode comprising a porous molded article including a negative electrode active material comprising Si, a conductive material and a binder,
    wherein said binder comprises a non-crosslinked polyacrylic acid having a weight-average molecular weight of 300000 to 3000000.

2. The non-aqueous electrolyte secondary battery in accordance with claim 1,
    wherein said negative electrode contains said binder in an amount of 2 to 40 wt %.

3. The non-aqueous electrolyte secondary battery in accordance with claim 1,
    wherein said non-crosslinked polyacrylic acid has a weight-average molecular weight of 500000 to 2000000.

4. The non-aqueous electrolyte secondary battery in accordance with claim 1,
    wherein said negative electrode active material comprises either Si or an alloy containing Si.

5. The non-aqueous electrolyte secondary battery in accordance with claim 1,
    wherein said negative electrode active material comprises an alloy containing Si and a metal incapable of forming an alloy with Li.

6. The non-aqueous electrolyte secondary battery in accordance with claim 1,
    wherein said negative electrode active material comprises a phase A containing Si and a phase B containing an intermetallic compound comprising a transition metal element and Si, and
    said transition metal element is at least one selected from the group consisting of Ti, Zr, Fe, Co, Ni and Cu.

7. The non-aqueous electrolyte secondary battery in accordance with claim 1,
    wherein said porous molded article has a thickness of 50 to 800 μm.

8. The non-aqueous electrolyte secondary battery in accordance with claim 1,
    wherein said porous molded article has a porosity of 10 to 60%.

* * * * *